DIGITAL TO ANALOGUE DECODER CIRCUITS

FIG. 4
| DIGIT | X2[4] (+8) | X2[3] (+4) | X2[2] (+2) | X2[1] (+1) | -X2[4] (-8) | -X2[3] (-4) | -X2[2] (-2) | -X2[1] (-1) | TOTAL UNITS OF ATTENUATION |
|---|---|---|---|---|---|---|---|---|---|
| | LADDER SECTIONS | | | | | | | | |
| 0 | | | | | X | X | X | X | -15 |
| 1 | | | | X | X | X | X | | -13 |
| 2 | | | X | | X | X | | X | -11 |
| 3 | | | X | X | X | X | | | - 9 |
| 4 | | X | | | X | | X | X | - 7 |
| 5 | | X | | X | X | | X | | - 5 |
| 6 | | X | X | | X | | | X | - 3 |
| 7 | | X | X | X | X | | | | - 1 |
| 8 | X | | | | | X | X | X | 1 |
| 9 | X | | | X | | X | X | | + 3 |
FIG. 3
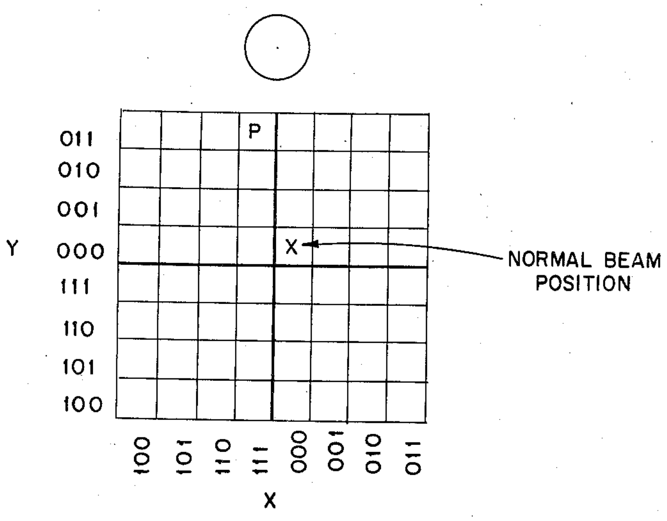
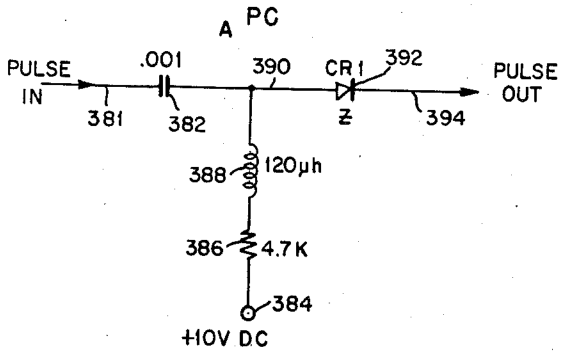
FIG. 5

United States Patent Office 2,970,306
Patented Jan. 31, 1961

2,970,306

DIGITAL TO ANALOGUE DECODER CIRCUITS

Henry E. Zieman, Lexington, Mass., and Julius I. Woolf, Levittown, Pa., assignors to Research Corporation, New York, N.Y., a corporation of New York Filed July 5, 1956, Ser. No. 595,993

9 Claims. (Cl. 340—347)

The present invention relates to an electronic circuit and more particularly to a digital-to-analogue decoder adapted to convert signals representative of digital information into an analogue potential having a magnitude proportional to the digital number to be converted.

With the advent of high speed digital computers into the field of electronic control and simulation systems, the need for conversion equipment to convert discrete values of digital information represented, for example, by a sequence of numbers into continuous analogue information has arisen. A digital-to-analogue decoder is a circuit which converts or changes a quantity represented by a set of numerical digits into an analogue quantity such as an electrical voltage or shaft position. Where this analogue quantity is voltage, it can be used for deflection of an oscilloscope beam, for operating a recording galvanometer or visual indicating instrument or, in conjunction with a servo-mechanism, for positioning a shaft.

One specific environment of a decoder of the type contemplated by the subject invention is in combination with a cathode ray tube display system wherein characters are generated for display by deflecting a diffused electron beam through a selected character in a character forming matrix. The cathode ray tubes employed in such a system are hereinafter referred to as a situation display CRT. Such a display system is described generally in copending application 573,991, now Patent No. 2,914,698, filed by Edwin J. Smura on March 26, 1956. In such a display system, a character selection circuit transforms digital information representing horizontal and vertical addresses of a specific character in the character forming matrix into analogue voltages which, after being suitably amplified, are applied to deflection plates in the CRT to direct the electron beam through the corresponding character on the matrix.

The digital information which serves as the input to the subject apparatus may be in any predetermined radix. Where high speed and high reliability are desired, it is frequently preferred to use the binary or base two system, since electronic equipment is inherently high speed and extreme reliability can be obtained with on-off devices. The subject apparatus will be illustrated and described in separate embodiments wherein the digital information may be in the decimal or binary form.

Several types of electronic digital-to-analogue convertors have been utilized in prior art systems. These systems, however, have generally proved unsatisfactory either because of the slow speed of conversion, the accuracy or linearity of conversion or the complexity of the equipment required. The type of digital-to-analogue decorder most frequently employed in the prior art is a binary weighted system of digital-to-analogue conversion. To obtain the desired conversion speed, a parallel-channel binary weighted digital-to-analogue decoder is employed wherein all of the digital information corresponding to the signal to be decoded is transmitted in parallel to the decoder and wherein each parallel-channel digit or bit is weighted in terms of its relative order of magnitude. The term "bit," as herein employed, refers to a binary signal, either a "1" or a "0," while the term "channel" refers to a binary order in a multiple order signal.

Several types of parallel-channel binary weighted digital-to-analogue convertors have been employed in the prior art. One method frequently employed utilizes binary weighted current sources which are combined at a common output. However, this method is undesirable in that a separate current source must be designed and its output controlled for each channel of input information. Since the current output from each channel differs from that of the preceding channel by a power of two, the number of binary bits in the input signal which can be handled on a practical basis is strictly limited.

A second method employed in the prior art utilizes binary weighted voltage sources wherein each voltage source is adjusted as to give a binary weighting to the output. This system has corresponding limitations as those noted with respect to the first system, in that the individual potential sources are required to be maintained within close tolerances.

A third method employed in the prior art is a single ended decoder of the type illustrated in U.S. Patent 2,718,634, issued to S. Hansen, September 20, 1955. In such a decoder, the values of the resistances used in a high accuracy decoder circuit extend over a fairly large range, the maximum output voltage is limited and non-linearity may be introduced into the output signal due to the large resistance values in the attenuation network whenever a fast time in the output voltage is required. This non-linearity will vary as a function of the magnitude of the input signal. This method further requires that the attenuation network be terminated in its characteristic impedance, thereby further limiting the amplitude of the output signal. A final limitation associated with this method is that common-mode variation may be introduced into the system due to power supply variations. A definition of common-mode variations and undesirable characteristics resulting therefrom may be found in The Radiation Laboratory Series, volume 19, Waveforms, published by McGraw-Hill, 1949, pages 358 and 359.

To overcome these limitations and obtain a potential output substantially proportional to the full excursion of the associated current gate tube, the present invention employs a variably terminated push-pull decoder circuit wherein the binary weighting is achieved by means of a multiple input resistance ladder network to which a plurality of substantially identical constant current sources are connected. In the preferred embodiment, two such networks are employed to obtain an X or horizontal and a Y or vertical deflection potential. By using a decoder network of the type above described, the following advantages are obtained as compared to the binary weighted systems of the prior art.

(1) The current sources associated with the digital input signals are identical, requiring only a single design and simplifying the installation, alignment and maintenance of each source.

(2) The individual current sources which are one of the primary factors in determining the accuracy of the output current are separated from the switching part of the circuit.

(3) The reference voltage circuit in the current source is not loaded down by power drain.

The above enumerated advantages will be readily apparent from the ensuing description.

Accordingly, a primary object of the present invention is to provide an improved digital-to-analogue decoder circuit.

Another object of the present invention is to provide a multiple channel digital-to-analogue decoder circuit employing a variably terminated push-pull binary weighted ladder attenuation network.

A further object of the present invention is to provide an improved digital-to-analogue decoder circuit for conversion of multiple channel digital information wherein binary weighting is achieved by employing a binary weighted ladder resistance network, the individual ladder sections in this network being energized by a constant current source from the associated channel.

Still another object of the present invention is to provide an improved apparatus for converting a plurality of digits in a predetermined radix into an equivalent potential by actuating a constant current circuit for each digit, applying the resulting current to different inputs in an attenuation network and combining the resulting attenuated signals at the output of the attenuation network.

Another and still further object of the present invention is to provide an improved digital-to-analogue decoder for transforming a multi-digit number into an equivalent analogue potential by generating a signal for each possible digit in the number, the signals representing the actual digits in the number being of opposite polarity with respect to the remaining signals, attenuating each of these signals by a factor determined by the place of its respective digit in the number and combining the resultant signals to obtain the analogue potential.

Another object of the present invention is to provide an improved device for transforming a group of signals representing the binary digits, respectively, of a binary number into a push-pull equivalent potential by generating signals of substantially constant amplitude for each binary digit, the polarity of the signal varying according to the binary digit, attenuating each of said signals by a different predetermined amount and deriving the algebraic sum of the attenuated signals.

Still another object of the present invention is to convert a multi-digit binary number into a corresponding analogue potential by generating a signal for each digit in the binary number, the signal for a binary 1 being of opposite polarity than the signal for a binary 0, attenuating each of the signals by a predetermined amount and deriving the algebraic sum of the resultant voltages to obtain the analogue potential.

Another object of the present invention is to provide an improved apparatus for transforming a plurality of digits representing the signals, respectively, of a decimal number into an equivalent analogue potential by generating a series of time coincident signals of equal magnitude, the polarity of these signals varying in accordance with the code for the particular character, attenuating these signals by a factor determined by the place of its respective digit in the number and combining the attenuated signals to form the analogue potentials.

A further object of the present invention is to provide an improved apparatus for converting a plurality of signals representing the digits, respectively, of a decimal number into a potential which represents the analogue equivalent of the decimal number by converting each signal into a current having a predetermined polarity determined by the digit, applying these currents simultaneously to an attenuation network to generate a plurality of potentials corresponding to the associated digits' place in the digital number and combining these potentials to obtain a single potential corresponding in magnitude to the analogue equivalent of said plurality of digital signals.

Another and still further object of the present invention is to provide an improved apparatus for transforming a group of signals representing the digits, respectively, of a digital number into an equivalent analogue potential by converting each of the group of signals to a constant current of predetermined magnitude, converting each constant current into a potential corresponding in magnitude to the associated digits' places in the digital number and combining the individual potentials to obtain the analogue equivalent of the digital number.

Other objects of the invention will be pointed out in the following description and claims and illustrated in the accompanying drawings, which disclose, by way of example, the principle of the invention and the best mode, which has been contemplated, of applying that principle.

In the drawings:

Fig. 3 illustrates the 8 x 8 character forming matrix and the binary code identifying the X and Y coordinates of each character position.

Fig. 4 illustrates a table of values showing the attenuation in the ladder sections for a decimal embodiment of the subject invention.

Fig. 5 illustrates in schematic form pulse coupling circuits of the type shown as blocks 161—166 in Fig. 1.

Before proceeding with a description of the subject apparatus, some of the general problems associated with electronic conversion apparatus will be noted. The important considerations in a digital-to-analogue device are:

(1) Accuracy of conversion.

(2) Sensitivity of conversion, i.e., ability to reproduce a small change in the digital input quantity in the analogue output.

(3) Freedom from drift.

(4) Conversion time.

(5) Stability, i.e., the holding or non-holding property of the output.

In addition to the above considerations, numerically weighted conversion devices present special problems in terms of accuracy of components.

The subject invention is extremely accurate to within 0.1%, is able to reproduce changes in the digital input within the above accuracy in the output, is substantially drift-free, has a relatively rapid conversion time and is extremely stable in operation. The accuracy requirements for components in the subject apparatus are fully described hereinafter.

The subject apparatus may be considered as comprising four basic elements; voltage reference circuits, constant surrent sources, current switching devices and a weighted attenuation network. The overall logical system will first be described with reference to Figure 1, followed by a detailed description in connection with the schematic diagram of the system illustrated in Figure 2.

Since the preferred embodiment must provide analogue potentials for the horizontal and vertical deflection plates of the situation display CRT, the subject apparatus includes two substantially identical decoding networks. To simplify the ensuing description, only one of these networks will be described, since a description of one is considered sufficient for an understanding of both. A third network included in the subject apparatus provides analogue potentials to deflect the beam of the cathode ray tube to a particular spot above the character forming matrix.

Figure 1:
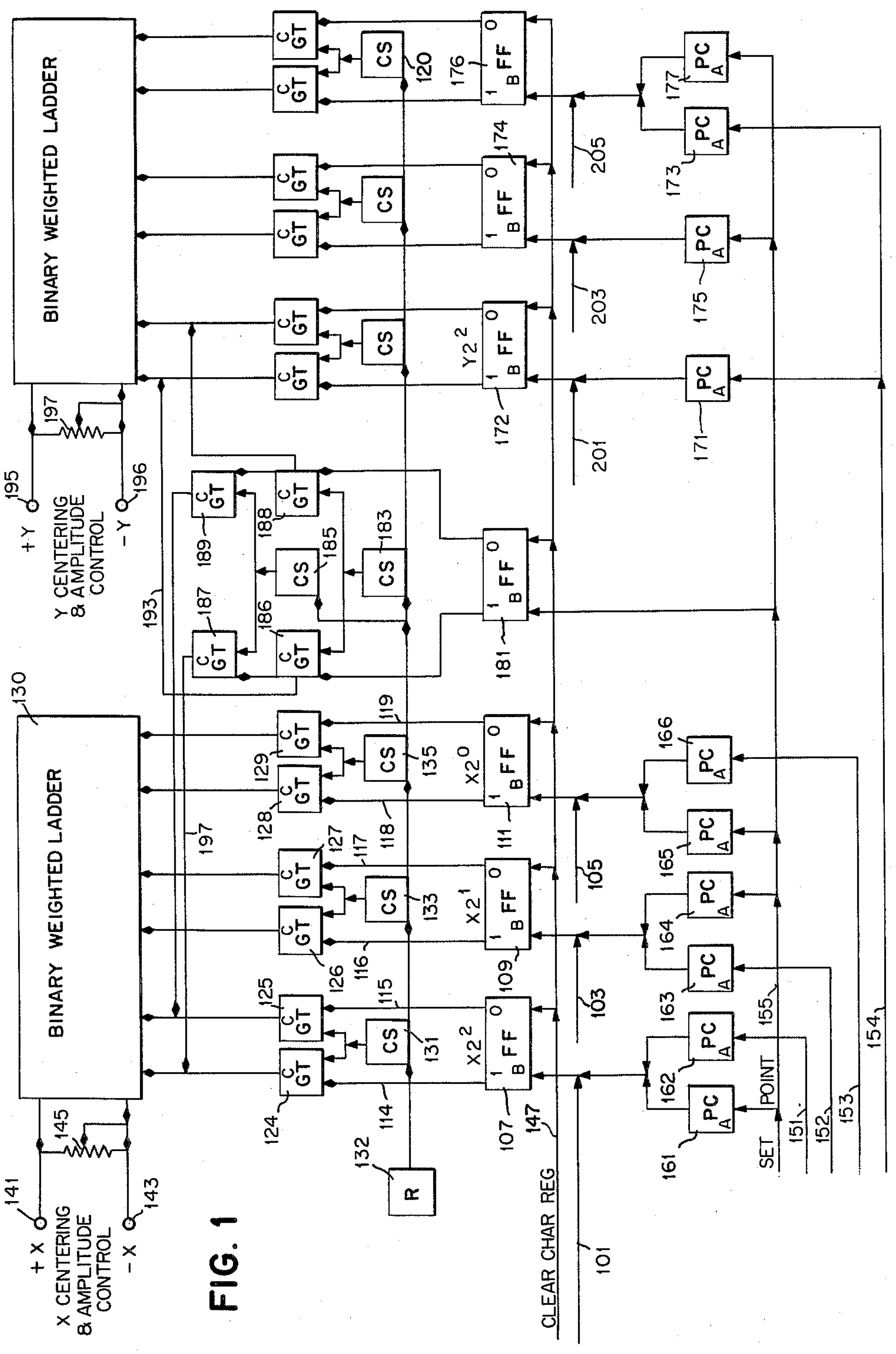
Fig. 1 illustrates in simplified block form the logical arrangement of the preferred embodiment of the subject invention wherein the digital input is in binary form.

Referring now to Fig. 1, digital information is applied through conductors 101, 103 and 105 to flip-flops 107, 109 and 111 respectively. Flip-flops 107, 109 and 111 may be considered part of a character selection register, the number of stages of which are determined by the number of characters in the character selection matrix. In the particular environment herein described, three horizontal and three vertical flip-flops are employed to select any one of 64 characters in an 8 x 8 character matrix.

Flip-flops 107, 109 and 111 are of the type wherein a positive pulse of relatively short duration applied to the "1" or "0" input produces a positive D.C. level of approximately +10 volts on the corresponding output and a negative D.C. level of approximately —30 volts on the opposite output. The D.C. level outputs from flip-flops 107, 109 and 111 are applied from conductors 114 through 119 to current gate circuits 124 through 129 respectively. The input to one of each pairi of current gate circuits will be +10 volts from the flip-flop side that is said to be On, the input to the other current gate circuit is —30 volts from the flip-flop side that is said to be Off. The second input to current gate circuits 124 through 129 is applied from current sources 131, 133 or 135, each of these current sources controlling two gate circuits. The current sources remain continuously applied to the associated current gate circuits during operation of the subject apparatus. The current sources which supply the second input to the current gate circuits provide currents of substantially equal magnitude through current gate circuits to the associated ladder sections.

As shown and described in greater detail hereinafter, a current gate circuit is a vacuum tube switching circuit which is employed to separate the output section from the current regulating section of the present apparatus. Since a flip-flop is a bi-stable device which is always in one stable state except during transition, and since the current from each current source is applied to two current gate circuits, it is obvious that current can flow from only one of each pair of companion current gate circuits, and that a constant current will be provided by the selected current gate circuit until the conduction state of the associataed flip-flop is reversed.

Current gate circuits 124 through 129 function as switching devices between the attenuation network 130 and the associated current sources. The current gate tube receiving the +10 volt signal from the flip-flop will conduct current from the source tube through the ladder section associated therewith; the current gate tube section receiving the —30 volt signal will not conduct current to the attenuation network. In this manner, each bit of the character selection signal will be converted through paired decoder stages i.e., into a push-pull analogue voltage. The current gate tubes prevent the voltage variations in the attenuation network from changing the state of the associated flip-flop.

The requirement for constant current sources such as 131, 133 and 135 presents the problem of maintaining a constant current output despite a relatively wide variation of line voltage. For satisfactory operation in the subject apparatus, the current sources must be drift-free, capable of being switched from one section of the attenuation network to another under the control of the associated flip-flop and insensitive to voltage changes in the ladder attenuation network produced by neighboring current sources. In the preferred embodiment, the current gate tubes separate the output from the current regulating part of the circuit so that the output current from a consant current source is relatively unaffected by large deviations in output voltage.

To provide this constant current output, a stabilized voltage source 132 is employed to maintain a constant bias on the control grids of current sources 131, 133 and 135 despite any variation in line potential. The output from current gate tubes 124 through 129 is applied to ladder sections in the attenuation network, these ladder sections, as described hereinafter comprising resistive networks connected to a common supply voltage. The voltage attenuation produced by the ladder sections associated with gates 124 or 125 as measured across the output terminals of the ladder network, is one-half the attenuation produced by ladder sections associated with the gates 126 or 127 while the attenuation developed by ladder sections associated with current gate tubes 126 or 127 across the terminating potentiometer 145 is one-half the attenuation developed by he ladder sections associated with the gates 128 or 129. This attenuation produces the necessary binary weighting which is readily apparent if it is recalled that a shift one position to the left of a binary number doubles the number's magnitude, while a shift one position to the right reduces it by one-half. For example, 0100 has a value of 4 in the binary system; while 1000, a shift 1 place to the left, has a value of 8; and 0010, a shift 1 place to the right from the original position, has a value of 2.

As shown and described hereinafter, when current from selected current gate tubes 124 through 129 is applied to the attenuation network, a voltage is produced in the associated sections in a negative direction from the supply voltage. Simultaneously, the current in the companion ladder section is cut off, and its output potential approaches the supply voltage. In a multi-stage decoder of the type herein described, the various ladder sections are connected in a push-pull arrangement in the manner shown in Fig. 2. As a result of this arrangement, a push-pull output voltage is obtained wherein the output of the ladder attenuation network is weighted in a binary fashion.

Potentiometer 145 is used to provide a variably terminated unbalanced output wherein the output level may be adjusted to any value within the range of the potentiometer. By means of this arrangement, the magnitude of the output potential may be substantially higher than the corresponding output from a single ended decoder network terminated in its characteristic impedance. Conductor 147, labeled "clear char. reg.," is used to reset the flip-flops in the character selection register following each individual character selection.

Before describing the remaining inputs to the character selection register, the particular environment in which the subject circuit is associated will be briefly described. The situation display system may be employed to display information, such as radar returns, aircraft tracks, etc. of a comparatively rapid changing nature. This information may be displayed in the form of grouped characters either alone or adjacent to a symbol or a vector, the symbol indicating the nature of the display and a vector indicating a direction and velocity of a particular object identified by the adjacent characters. Characters of the type herein employed may include letters, numbers or special characters.

In addition to the characters which are selected by digital information on conductors 101, 103 and 105, some characters may be alternately selected in response to appropriate signals on selected ones of conductors 151 through 154, while a point on the character selection matrix positioned above the 8 x 8 character matrix and used for generation of a vector in a manner hereinafter described, may be selected by a positive pulse on conductor 155 labeled "Set Point." Pulse coupling circuits 161 through 166 are connected between input conductors 151, 152, 153 and 155 and flip-flops 107, 109 and 111 respectively. Pulse coupling circuits 171 and 173 couple conductor 154 to flip-flops 172 and 176 in the vertical section of the character selection register. Pulse coupling circuits 175 and 177 couple conductor 155 to flip-flops 174 and 176 in the vertical character selection register.

Flip-flop 181, current sources 183 and 185, and current gate tubes 186 through 189, in combination with the flip-flops, current sources and current gate tubes actuated by a positive pulse on conductor 155, are employed to select the point used to generate the vector. In response to a positive pulse on conductor 155, flip-flop 181 conditions current gate tubes 186 and 187. Current sources 183 and 185 in combination with regulated voltage source 132 provide a constant current to the associated current gate tubes in the manner heretofore described. When flip-flop 181 is in the binary "1" state, the output from current gate tube 186 is applied through conductor 193 to the most significant input to the vertical binary weighted attenuation network while the output from current gate tube 187 is applied through conductor 197 to the corresponding input to the horizontal binary weighted attenuation network 131. In this manner, the horizontal and vertical analogue outputs are varied to the extent required to select the point above the character matrix. As shown in Fig. 1, a pulse on conductor 155 causes output signals of 111 and 011 to be generated by the character selection register flip-flops. The particular way in which the point is selected in response to the above signals is fully described with reference to Fig. 3.

While the decoder used to obtain the horizontal deflection potential has been described in detail, in a similar manner, digital information applied to flip-flops 172, 174 and 176 through conductors 201, 203 and 205 is converted through a substantially identical circuit as that described with the horizontal deflection to a push-pull analogue potential at output terminals 195 and 196. Potentiometer 197 provides the variable termination for the output signal.

Summarizing the description of the subject apparatus, digital information in the form of binary numbers representing specific vertical and horizontal character matrix addresses are supplied to the character selection decoder for each character in a message. Each character address consists of three X bits and three Y bits which are sent to the character selection decoder at intervals until characters for the entire message have been selected. A binary weighted decoding network is employed wherein the analogue voltage developed by each bit is proportional to the polarity of the bit and the relative position of the bit in the binary number. The decoder transforms the bits into push-pull analogue voltages which, after being suitably amplified, are applied to horizontal and vertical deflection plates of the situation CRT to thereby direct the CRT electron beam to a particular letter, number or symbol in the character forming matrix. Details of the circuits supplying the digital signals to the decoding network are omitted, since they are not considered necessary for an understanding of the present invention. While any flip-flop circuit which responds to a one-tenth micro-second signal may be employed in the character selection register, the flip-flops are preferably the model B type shown in copending application 473,874, now Patent No. 2,848,608, "Electronic Ring Circuit," "IBM" Docket 4492, filed by R. E. Nienburg on December 8, 1954. Pulse coupling circuits such as blocks 161 through 166 in Fig. 1 are shown and described hereinafter.

Figure 2:
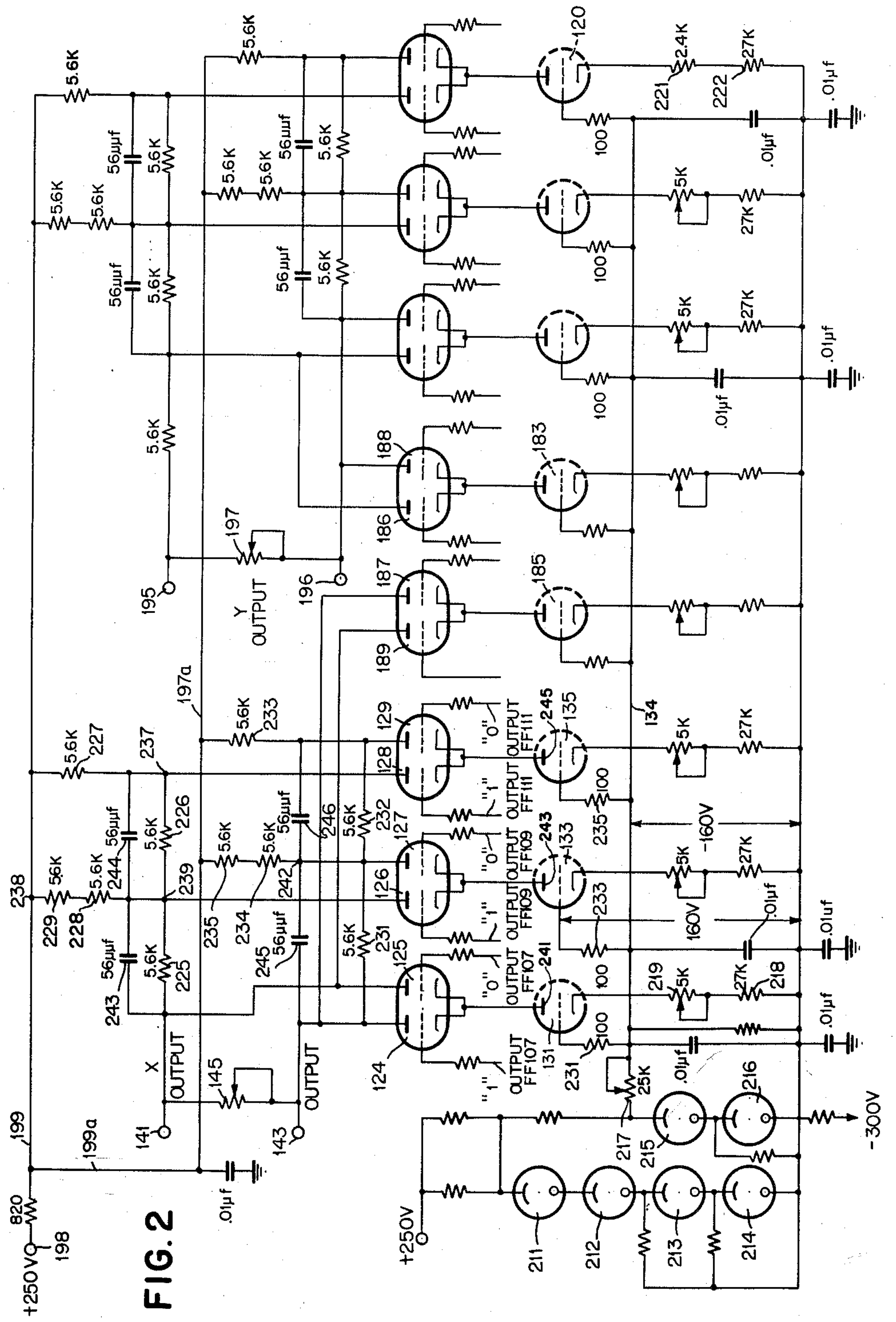
Fig. 2 illustrates in schematic form the details of the subject invention shown in block form in Fig. 1.

Referring now to Fig. 2, there is illustrated in schematic form the details of the digital-to-analogue decoding circuit, shown in block form in Fig. 1, including the constant current sources, current gate tubes, regulated voltage source and binary weighted ladder attenuation network. The voltage regulator shown as block 132 in Fig. 1 comprises a number of voltage regulator tubes 211–216 connected in a series-parallel arrangement. The arrangement employed in the preferred embodiment provides an overall accuracy better than that indicated by the sum of the individual accuracies of the component voltage regulator tubes. This results from the fact that the errors in all tubes may be expected to occur in a random fashion rather than to occur simultaneously.

As is well known in the art, the larger the magnitude of the reference voltage, the larger may be the variation in other parts of the circuit without interfering with the accuracy of the output curent. In the preferred embodiment, a 550 volt potential varying between +250 and −300 volts is applied to the voltage regulator circuit, from which approximately −140 volts is supplied to conductor 134. Since this −140 volts from the voltage regulator varies directly as the −300 volt supply, a constant voltage of approximately 160 volts is maintained between the control grids of current sources 131, 133 and 135 and the −300 volt supply and therefore across cathode resistors such as series connected resistor 218 and potentiometer 219 associated with current source 131. This bias may be adjusted by potentiometer 217 in the bleeder circuit of the voltage regulator circuit. While a single voltage regulator tube has about 1% accuracy because of the high noise level associated with this type of tube, by means of the above described arrangement, the noise level is minimized and the voltage regulated within an accuracy of 0.1%.

To achieve a high output accuracy, it is necessary that the output from the constant curent sources 131, 133 and 135 be maintained substantially constant. Basically, constant current action is achieved by employing a relatively large amount of cathode degeneration in the associated current source tubes. The current source 120 associated with the least significant bit in the vertical character selection address has a 2.4K ohm resistor 221 and a 27K resistor 222 in its cathode circuit and functions as the reference current source. The remaining current sources are adjusted by the associated 5K potentiometers to provide an output corresponding to that of the reference current souce 120.

As heretofore noted, to generate a constant current, it is necessary that a reference voltage such as that provided by voltage regulator 132 be converted into a current which can be maintained within a specified accuracy over a given range of voltage variations on the output terminal of the current source. In the preferred embodiment herein described, anodes 241, 243, and 245 of current sources 131, 133 and 135 are cascode-connected as shown to the cathodes of current gate tubes 124 through 129, each current source supplying two current gate tubes. Since the effect of voltage variation in various parts of the current source circuit is decreased in proportion to the circuit gain, it is desirable to employ a tube having a high gain in the current source circuit. In the preferred embodiment, type Z2177 duo-triodes are employed as the current source tubes.

The current gate tubes in the preferred embodiment employ a twin triode arrangement wherein vacuum tubes 124 and 125, 126 and 127, 128 and 129 are enclosed in single envelopes having a common cathode output, the cathodes being connected to anodes 241, 243 and 245 of current sources 131, 133 and 135 respectively. The control grids of current gate tubes 124 through 129 are connected to the "1" or "0" outputs of the associated one of the flip-flops 107, 109 or 111 in the character selection register. These flip-flops function as holding or storage devices so that the switching signal may be applied to the curent gate tube for as long as an output current is desired. Since a flip-flop is a bi-stable device in which the component tubes are in opposite states of conduction at any given time except when the flip-flop is being switched, either a +10 or a −30 volt D.C. level from the flip-flop will be applied to the control grid of the associated current gate tube. The current gate tube section receiving the +10 volt signal will permit current from the associated current source tube to flow through the associated section of attenuation network 130. In this maner, a three bit binary character will automatically be converted through paired decoder stages, each stage comprising a current gate tube section and the binary weighted attenuation network into a push-pull binary weighted analogue voltage.

The binary weighted ladder attenuation network may be considered as comprising individual ladder sections, each section consisting of combinations of R and 2R resistors arranged to produce the desired weighting, together with capacitors to increase the response time of the associated sections and thereby provide for the simultaneous conversion of the input signals at the output terminals of the network. In the preferred embodiment, the value of R is 5.6K ohms, that of 2R is 11.2K ohms. Since the attenuation network is terminated across output terminals common to all ladder sections, the resistance value seen by input conductors will be the equivalent resistance of the attenuation network at that particular point.

To provide maximum voltage output, a relatively high impedance should be provided to the current sources representing the most significant digit. In the preferred embodiment, the impedance presented to current gates 124 and 125 representing the most significant bit is 2R or 11.2K ohms. The output from current gate 125 is connected to resistor 225 in series with the parallel combination of resistors 226, 227 and 228, 229. The equivalent resistance of resistors 226, 227 in parallel with resistors 228, 229 is R, 5.6K ohms. Thus, the total resistance to current source 125 is $R+R=2R$ or 11.2K ohms. Similarly, the resistance presented to current source 124 is 2R ohms, consisting of resistor 231 connected in series with parallel connected resistors 232, 233 and 234, 235. The equivalent resistance of resistors 232, 233 in parallel with resistors 234, 235 is R or 5.6K ohms. Thus, the total resistance presented to current source 124 is $R+R=2R$ or 11.2K ohms.

Turning now to the next bit, the impedance presented to the output from current source 126 consists of the equivalent impedance of serially connected resistors 228, 229 in parallel with serially connected resistors 226, 227. Thus, the impedance presented to current source 126 consists of two 2R resistors in parallel or R(5.6K) ohms. Similarly, the equivalent impedance presented to current source 127 comprises serially connected resistors 232 and 233 in parallel with serially connected resistors 234 and 235. This combination also provides an equivalent resistance of R or 5.6K ohms. Thus, the impedance presented to the second significant binary digit is half the impedance presented to the most significant.

Turning now to the least significant digit, the impedance presented to current source 128 consists of resistor 227 in parallel with serially connected resistors 226, 228 and 229. The equivalent impedance of R in parallel with 3R is ¾R ohms. However, this represents the impedance between points 237 and 238, while the output potential representing the least significant digit is that developed across terminals 238 and 239. Therefore, the potential developed between terminals 238 and 239 is two-thirds of ¾R, or $R/2$. In a similar fashion, the impedance presented to current gate 129 consists of resistor 233 in parallel with serially connected resistors 232, 234 and 235. The potential developed between terminals 241 and 242 is two-thirds of ¾R or $R/2$. Capacitors 243 through 246 are provided in the attenuation network to ensure that the output from each stage of the decoder is developed across the output terminals 141 and 143 simultaneously.

From the above description, it is apparent that binary weighting is achieved by weighting the attenuation presented to the current sources in a binary fashion, and applying a constant current source to each stage of the decoder network. Potentiometer 145, connected across the output terminals, is employed to vary the output potential to the desired level, but has no effect on the binary weighting. Since the output potentiometer will be set at a selected value prior to operation of the subject apparatus, it will be constant for a particular application. A constant load resistance placed across the output terminals will only vary the magnitude of the output voltage, but will in no way affect the linearity or binary weighting of the decoder. In addition, the output can be substantially increased over the corresponding output of a single-ended balanced decoder network terminated in its characteristic impedance.

The Y or vertical decoder network operates in an identical manner as the X network described above to provide a vertical deflection analogue potential at output terminals 195 and 196. The equivalent impedance presented to current gate tubes 189 and 187 is identical to that presented to current gate tubes 124 and 125, but the potential developed thereby is varied by adjusting the current output from current source 185 to the desired level.

Referring now to Fig. 3, there is illustrated in simplified form the 8 x 8 character matrix, the spot above the matrix and the binary code which defines the addresses of the selected characters in the embodiment illustrated in Fig. 1. The particular characters within the matrix are not shown, since they are not considered material to the invention.

The beam normally rests at the position indicated by the X in the first character position northeast of center. As shown, in the horizontal or X coding arrangement, to the right of center the three bit addresses rise by single binary steps, 000, 001, 010 and 011, the first digit in each address indicating the highest order or most significant bit. To the left of center, addresses start at the maximum binary value and decrease in successive binary steps, 111, 110, 101 and 100. Thus, the first binary bit in the horizontal address defines whether the address is to the right or left of center, the remaining two bits define the exact horizontal location.

The vertical or Y addresses from the center upward start at the lowest binary number of 000 and proceed successively in single binary steps in the same manner as the X addresses. The Y addresses below the center start at the highest binary valve of 111 and decrease in successive binary steps similarly to the X addresses. Thus, the first bit of the Y address defines whether the address is above or below the center of the matrix, while the succeeding two bits define the exact position of the address. From the above description in view of Fig. 3, it is obvious that any combintaion of three bit horizontal and vertical addresses will define the exact location of a character within the 8 x 8 matrix.

Before describing the manner in which a spot is generated, it is relevant to note why a hole above the matrix rather than a suitable character within the matrix is required for the generation of a spot. To generate a character, a de-focused beam is passed through the character defined by the associated X and Y address. To generate a spot, however, a focused beam must be applied through a suitable opening. In order to direct the beam through a suitable opening in a character, a geometrically or symmetrically perfect electron gun would be required, since a slight deviation of the focused beam from the selected character might cause the beam to miss the opening. Since it is not commercially feasible to mass produce perfectly symmetrically electron guns, the beam is directed through a hole approximating three characters in size.

The beam is directed to the hole above the character forming matrix in the following manner. Referring back to Fig. 1, it is noted that the X and Y addresses generated by a positive signal on conductor 155 labeled "Set Point," are 111 and 011 respectively. In addition, flip-flop 181 is set in the "1" state. The character location corresponding to the X and Y Point addresses is indicated in Fig. 3 by the character location labeled "P." Flip-flop 181, current sources 183 and 185 and current gate tubes 186 and 187 operate in the following manner to provide the additional deflection potential required to move the beam from the P position to the hole above the character matrix.

When flip-flop 181 is set in the one state, it conditions curernt gate tubes 186 and 187. When current gate tube 186 is thus conditioned, it permits current to flow from current source 183 through conductor 193 to the most significant input conductor to the Y binary weighted ladder attenuation network, thereby providing the necessary additional potential to deflect the beam from point P in a vertical direction to the center of the hole above the matrix (Fig. 3). When current gate tube 187 is thus energized, it allows current from current source 185 to flow through conductor 197 to the most significant input conductor to the X binary weighted ladder attenuation network 130, thereby providing the additional current necessary to deflect the beam in a horizontal direction to the center of the hole. While it is obvious that the additional voltage added to the normal output from the X and Y attenuation networks is the amount required to deflect the beam to the center of the hole, the increment of voltage from current source 185 is half the normal voltage provided by current source 135, since the center of the hole occurs between characters.

While the preferred embodiment heretofore described assumed a binary input, a decimal coded signal could also be decoded in the following manner. As previously described with reference to Fig. 2, the binary weighted ladder attenuation network shown as block 130 in Fig. 1 consists of two substantially identical decoding networks, the inputs to one network being controlled by the one side of the input flip-flops, the inputs to the second network being controlled by the other side of the input flip-flops. In this modification, each decoding network may be considered as including four binary weighted attenuation sections, the "1" output from the flip-flops controlling all inputs to the sections in one network, the "0" output controlling all inputs to the sections in the other network.

To obtain an analogue equivalent of decimal digits "0" through "9," a four stage decoding system similar to the three stage system illustrated in Fig. 1 would be required. The inputs to all flip-flops would be controlled by conventional logical pulsed "OR" circuits, which in turn would be controlled by the decimal digital inputs. For "0" through "9," the ten input conductors representing these digits would be applied to one or more pulsed "OR" circuits, the outputs of which would be applied to the "1" side of the input flip-flops.

To provide a decoder for generating an analogue potential varying in amplitude as a function of the decimal input, reference is made to Fig. 1. A fourth stage comprising a flip-flop $X2^4$, together with a current source and two current gate tubes connected in the manner illustrated in Fig. 1 would be combined with the present three stage apparatus. Thus, any decimal digit from "0" through "9" could be accommodated by a particular combination of the four input flip-flops. For example, the decimal number 1 or 2 would control the $X2^1$ or $X2^2$ input, respectively, decimal number 7 the $X2^3$, $X2^2$ and $X2^1$ inputs and decimal number 9 the $X2^4$ and $X2^1$ inputs, etc. Due to the bi-stable nature of the flip-flops, those flip-flops not included in the number to be decoded would remain in the "0" state. The "1" output from the input flip-flops included in the decimal digit would be applied to one of the above described identical decoding networks.

To illustrate the operation of the present apparatus, the attenuation sections energized by the "1" outputs from the input flip-flops will be considered positive, while the corresponding attenuation sections energized by the "0" output of the flip-flops will be considered negative.

Referring now to Fig. 4, there is illustrated in tabular form the attenuation sections in the four stage network which would be energized for decimal digits "0" through "9" together with the resultant attenuation under the above described assumptions. As noted heretofore, the section associated with the "1" output from the flip-flops is assumed positive, corresponding sections associated with the "0" output from the flip-flops are assumed negative. A "0" would be represented when all flip-flops are in the "0" state, resulting in a total of −15 units of attenuation. Each succeeding digit will energize the attenuation sections shown in the table and increase the resultant attenuation in two unit increments, varying between −15 units of attenuation for "0" to +3 units of attenuation for "9." Since the variation in the attenuation networks is uniform, the analogue potential for successive decimal digits is uniform and the output potential representing the analogue equivalent of the decimal input varies as a function of the decimal input. The variation in the potential across the output terminals of the attenuation networks resulting from these decimal inputs could be made to indicate the actual numerical values of the digit through suitable means such as a calibrated indicator in the output equipment. In this manner, all decimal digits between "0" and "9" will produce an analogue potential corresponding to a binary weighted representation of the digit.

While the apparatus necessary to decode a single digit decimal number has been described, such apparatus could be either duplicated or extended as required to provide an analogue equivalent of a multi-digit number. Similarly, while only a single decoder element has been described to illustrate the decimal embodiment, a second decoder element identical to that above described would be required to provide a pair of output potentials suitable for character selection. In like manner, the additional circuitry required to select a point above the character matrix could be provided in a manner similar to that shown and described in Fig. 1.

Referring now to Fig. 5, there is illustrated in schematic form a pulse coupling circuit of the type shown as blocks 161 through 166 in Fig. 1. The pulse coupling circuit is essentially a level changing circuit in which the levels of the input pulses applied thereto are changed to levels suitable for effecting operation of a flip-flop circuit. Assuming, for example, that a negative input pulse varying between −150 and −190 volts is applied to any of the input conductors 151 through 155, the pulse coupling circuit converts this to a negative pulse varying between levels of +10 and −30 volts.

Assuming a negative pulse varying between −150 and −190 volts is applied to conductor 381, the potential across capacitor 382 will initially be 160 volts, the difference between the starting value of the pulse (−150 v.) and +10 volts applied from terminal 384 through resistor 386 and inductance 388 to the opposite side of the capacitor. When the input pulse drops to −190 volts, the potential across capacitor 382 cannot change instantaneously, so the difference of 40 volts is coupled through the capacitor to conductor 390. Since conductor 390 has a reference potential of +10 volts applied thereto as heretofore described, the 40 volt transition causes the potential on conductor 390 to drop to −30 volts. Resistor 386 and inductor 388 provide a high impedance to this pulse, but a low impedance to direct current. The negative pulse on conductor 390 is then coupled through diode 392 to output conductor 394. Diode 392 prevents the output from falling faster than a given rate irrespective of the rate of this fall of the input pulse. The resultant negative pulse is then utilized to set the associated flip-flop to the one state in the manner illustrated in Fig. 1.

While apparatus for generating an analogue equivalent of a binary or a decimal digit has been described, the principles of the present invention are equally applicable to digital information in any other radix. By means of the present apparatus, versatility, precise results and high-speed information can be achieved by handling the information in digital form, while a direct representation of such digitally encoded information is provided for the output circuitry.

While there have been shown and described and pointed out the fundamental novel features of the invention as applied to a preferred embodiment, it will be understood that various omissions and substitutions and changes in the form and details of the device illustrated in its operation may be made by those skilled in the art without departing from the spirit of the invention. It is the intention, therefore, to be limited only as indicated by the scope of the following claims.

What is claimed is:

1. A digital-to-analogue decoder comprising in combination a source of digital signals, a weighted ladder including first and second attenuation networks connected together in push-pull relationship, a common output circuit associated with said networks, each of said networks including a plurality of attenuation circuits connected in tandem, attenuation circuits in one of said networks having corresponding attenuation circuits in the other of said networks, a common current source for each said pair of corresponding circuits and means for selectively applying current from said source to only one or the other attenuation circuit of each pair of corresponding circuits in accordance with said digital signals whereby a signal corresponding in magnitude to the digital input is developed in said output circuit.

2. The digital-to-analogue decoder as claimed in claim 1 wherein said common output circuit comprises a terminal associated with each network and further including a variable impedance connected across said terminals.

3. The digital-to-analogue decoder as claimed in claim 1 wherein said networks are connected to a common source of potential.

4. The digital-to-analogue decoder as claimed in claim 1 wherein said networks are binary weighted ladder attenuation networks.

5. The digital-to-analogue decoder as claimed in claim 1 wherein said current source for each pair of corresponding circuits is arranged to provide substantially constant current to the associated pair of corresponding attenuation circuits.

6. The digital-to-analogue decoder as claimed in claim 5 wherein said means for applying current includes an electronic gating device associated with each attenuation circuit.

7. The digital-to-analogue decoder as claimed in claim 6 and further including a storage register for said digital signals comprising a plurality of bistable devices, one associated with each pair of corresponding attenuation circuits, said bistable devices adapted to control the operation of said gating devices.

8. A digital-to-analogue convertor for transforming a plurality of signals representing the binary digits of a binary number into an equivalent analogue potential comprising a binary weighted ladder including a pair of attenuation networks arranged in push-pull relationship and connected to a variably terminated output circuit, each of said attenuation networks including an attenuation section for each digit of said binary number, each section in one attenuation network being substantially identical to a corresponding section in the other of said attenuation networks whereby a pair of attenuation sections are utilized for each binary digit input, a source of current associated with each corresponding pair of said attenuation networks and means responsive to said plurality of signals to apply current from each said current source to only one or the other of each pair of identical attenuation sections in said attenuation networks arranged in push-pull relationship whereby a potential corresponding in amplitude to said digital number is developed in said variably terminated output circuit.

9. An electronic circuit for generating opposing deflection potentials for deflecting a cathode ray beam to a predetermined position defined by digital signals comprising, in combination, a source of digital signals including a storage register, said storage register comprising a plurality of bi-stable devices, each bi-stable device having a pair of output conductors, a current gate circuit associated with each of said output conductors, a constant current source associated with each pair of output conductors for conditioning the corresponding pair of current gate circuits, a plurality of binary weighted double-ended ladder attenuation systems, each of said systems comprising a first and second substantially identical attenuation network, each of said networks including a plurality of serially connected attenuation sections corresponding to the number of stages in said digital number, each attenuation section in each of said attenuation networks being substantially identical to a corresponding attenuation section in the other of said attenuation networks and having an input terminal associated therewith, the input to each pair of substantially identical attenuation sections being controlled by one of said output conductors of an associated bi-stable device in said storage register, a common output circuit associated with each first and second ladder attenuation network, one terminal of said output circuit being connected to the output of one of said attenuation circuits, the other terminal of said output circuit being connected to the corresponding output of the other of said attenuation circuits, means for providing current from each said current source through one and only one of the pair of associated current gate circuits to selected attenuation sections in response to signals of a predetermined magnitude in said storage register and a variably terminated impedance connected across the output terminals of each pair of attenuation networks whereby the resulting current applied through said current gate circuits to selected attenuation circuits under the control of said bi-stable devices in said storage register causes deflection signals corresponding in magnitude to the digital signals applied to said storage register to be developed across said output terminals of said attenuation networks.

References Cited in the file of this patent

UNITED STATES PATENTS

| | | |
|---|---|---|
| 2,458,030 | Rea | Jan. 4, 1949 |
| 2,538,615 | Carbrey | Jan. 16, 1951 |
| 2,718,634 | Hansen | Sept. 20, 1955 |
| 2,840,637 | McNaney | June 24, 1958 |

UNITED STATES PATENT OFFICE
CERTIFICATION OF CORRECTION

Patent No. 2,970,306 January 31, 1961

Henry E. Zieman et al.

It is hereby certified that error appears in the above numbered patent requiring correction and that the said Letters Patent should read as corrected below.

Column 3, line 46, for "digits" read -- signals --; same line, for "signals" read -- digits --; column 4, line 47, for "surrent" read -- current --; column 5, line 7, for "pairi" read -- pair --; line 75, for "he" read -- the --; column 8, line 10, for "curent" read -- current --; line 21, for "souce" read -- source --; line 59, for "maner" read -- manner --; column 10, line 28, for "valve" read -- value --; line 50, for "symmetrically" read -- symmetrical --; column 12, line 37, for "(-150 v.)" read -- (-150 V) --; line 69, after "illustrated" insert -- and --.

(SEAL) Signed and sealed this 18th day of July 1961.

Attest:

ERNEST W. SWIDER
Attesting Officer

DAVID L. LADD
Commissioner of Patents